US011004067B2

(12) United States Patent
Cheng et al.

(10) Patent No.: US 11,004,067 B2
(45) Date of Patent: *May 11, 2021

(54) METHODS AND DEVICES FOR PROTECTING SENSITIVE DATA OF TRANSACTION ACTIVITY BASED ON SMART CONTRACT IN BLOCKCHAIN

(71) Applicant: Advanced New Technologies Co., Ltd., Grand Cayman (KY)

(72) Inventors: Long Cheng, Zhejiang (CN); Yanpeng Li, Zhejiang (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/081,311

(22) Filed: Oct. 27, 2020

(65) Prior Publication Data

US 2021/0042749 A1 Feb. 11, 2021

Related U.S. Application Data

(63) Continuation of application No. 16/737,190, filed on Jan. 8, 2020, now Pat. No. 10,853,801, which is a continuation of application No. PCT/CN2019/076656, filed on Mar. 1, 2019.

(51) Int. Cl.
*G06Q 20/38* (2012.01)
*G06Q 40/00* (2012.01)
(Continued)

(52) U.S. Cl.
CPC ... *G06Q 20/38215* (2013.01); *G06F 21/6245* (2013.01); *G06Q 20/102* (2013.01);
(Continued)

(58) Field of Classification Search
CPC .......... G06Q 20/38215; G06Q 20/102; G06Q 20/3829; G06Q 20/405; G06Q 40/02;
(Continued)

(56) References Cited

U.S. PATENT DOCUMENTS 10,102,526 B1 10/2018 Madisetti et al.
2015/0379510 A1 12/2015 Smith
(Continued)

FOREIGN PATENT DOCUMENTS

CN 108683646 A 10/2018
CN 109063049 A 12/2018
(Continued)

OTHER PUBLICATIONS

Written Opinion of the International Searching Authority of PCT Application No. PCT/CN2019/076656, dated Dec. 4, 2019, issued by the ISA/CN—National Intellectual Property Administration, PRC, China.

(Continued)

*Primary Examiner* — James D Nigh
(74) *Attorney, Agent, or Firm* — Finnegan, Henderson, Farabow, Garrett & Dunner, LLP

(57) ABSTRACT

Disclosed herein are methods, devices, and apparatuses, including computer programs stored on computer-readable media, for protecting sensitive data of a transaction activity based on a smart contract in a blockchain. One of the methods includes: receiving activity data for creating an account for the transaction activity from a user, the activity data including at least an identifier of the smart contract in the blockchain and an expiration time of the transaction activity; sending the activity data to an authentication server for requesting a digital certificate of the activity data, wherein the digital certificate stores the identifier of the smart contract, and an expiration time of the digital certificate is set to be the expiration time of the transaction activity; and causing the account for the transaction activity to be created after to receiving the digital certificate from the authentication server.

20 Claims, 6 Drawing Sheets

Related U.S. Application Data

(51) Int. Cl.
| | |
|---|---|
| *G06F 21/62* | (2013.01) |
| *G06Q 20/10* | (2012.01) |
| *G06Q 20/40* | (2012.01) |
| *G06Q 50/26* | (2012.01) |
| *H04L 9/06* | (2006.01) |
| *H04L 9/30* | (2006.01) |
| *H04L 9/32* | (2006.01) |
| *G06Q 40/02* | (2012.01) |

(52) U.S. Cl.
CPC ....... *G06Q 20/3829* (2013.01); *G06Q 20/405* (2013.01); *G06Q 40/02* (2013.01); *G06Q 40/12* (2013.12); *G06Q 50/265* (2013.01); *H04L 9/0637* (2013.01); *H04L 9/30* (2013.01); *H04L 9/3268* (2013.01); *G06Q 2220/00* (2013.01); *H04L 2209/38* (2013.01)

(58) Field of Classification Search
CPC .............. G06Q 50/265; G06Q 2220/00; G06F 21/6245; H04L 9/0637; H04L 9/30; H04L 9/3268; H04L 2209/38
USPC .......................................................... 705/71
See application file for complete search history.

(56) References Cited

U.S. PATENT DOCUMENTS

| | | | |
|---|---|---|---|
| 2017/0155515 A1 | 6/2017 | Androulaki et al. | |
| 2017/0236143 A1* | 8/2017 | Code et al. | G06Q 20/387 705/14.27 |
| 2019/0180329 A1* | 6/2019 | Chetlur | H04L 9/3239 |
| 2019/0228461 A1* | 7/2019 | Domokos | G06Q 30/0613 |

FOREIGN PATENT DOCUMENTS

| | | |
|---|---|---|
| CN | 109104419 A | 12/2018 |
| JP | 2003196440 A | 7/2003 |
| JP | 2010219787 A | 9/2010 |
| WO | WO 97/35262 | 9/1997 |
| WO | WO 2009/131130 A1 | 10/2009 |

OTHER PUBLICATIONS

International Search Report of PCT Application No. PCT/CN2019/076656, dated Dec. 4, 2019, issued by the ISA/CN—National Intellectual Property Administration, PRC, China.
Extended European Search Report for Application No. 19725910.4, dated Apr. 28, 2020.
Written Opinion of Application No. 11201908651S, dated Nov. 26, 2020, by the Intellectual Property Office of Singapore.
Examination Report of Australian Application No. 2019203848 dated Aug. 11, 2020.
Examination Report of Canadian Application No. 3,057,385 dated Mar. 25, 2021.
Decision to Grant of Japanese Application No. 2019-553042, dated Mar. 22, 2021.

* cited by examiner

METHODS AND DEVICES FOR PROTECTING SENSITIVE DATA OF TRANSACTION ACTIVITY BASED ON SMART CONTRACT IN BLOCKCHAIN

CROSS REFERENCE TO RELATED APPLICATIONS

This application is a continuation of U.S. application Ser. No. 16/737,190, filed on Jan. 8, 2020, which is a continuation of International Application No. PCT/CN2019/076656, filed Mar. 1, 2019, the entire content of all of which is incorporated herein by reference.

TECHNICAL FIELD

The specification relates generally to computer technologies, and more particularly, to methods and devices for protecting sensitive data of a transaction activity based on a smart contract in a blockchain.

BACKGROUND

Blockchain systems, also known as distributed ledger systems (DLSs) or consensus systems, may enable participating entities to store data securely and immutably. Blockchain systems may include any DLSs, without referencing any particular use case, and may be used for public, private, and consortium blockchain networks. A public blockchain network is open for all entities to use the system and participate in the consensus process. A private blockchain network is provided for a particular entity, which centrally controls read and write permissions. A consortium blockchain network is provided for a select group of entities, which control the consensus process, and includes an access control layer.

A blockchain system maintains one or more blockchains. A blockchain is a data structure for storing data, such as transactions, that may prevent tampering and manipulation of the data by malicious parties.

Blockchain systems have been used in scenarios with high requirements of openness and transparency, such as sales promotion or marketing activities. Traditionally, a blockchain system may create and manage accounts based on identities of its users. For example, the blockchain system may create one or more accounts for a merchant, and information regarding the accounts may be transparent to all users of the blockchain system. In some cases, other users may obtain the identities of the account owners based on their transactions recorded in the blockchain system, which are also transparent to all users of the blockchain system. Such inferable account-identity correspondence may cause involuntary disclosure of identities of account owners.

SUMMARY

In one aspect, there is provided a computer-implemented method for protecting sensitive data of a transaction activity based on a smart contract in a blockchain. The method includes: receiving activity data for creating an account for the transaction activity from a user, wherein the activity data include at least an identifier of the smart contract in the blockchain and an expiration time of the transaction activity, and the smart contract includes computer-readable instructions for conducting the transaction activity; sending the activity data to an authentication server for requesting a digital certificate of the activity data, wherein the digital certificate stores the identifier of the smart contract, and an expiration time of the digital certificate is set to be the expiration time of the transaction activity; and causing the account for the transaction activity to be created after receiving the digital certificate from the authentication server, wherein the created account is associated with the identifier of the smart contract.

In another aspect, there is provided a device for protecting sensitive data of a transaction activity based on a smart contract in a blockchain. The device includes: one or more processors and one or more computer-readable memories coupled to the one or more processors and having instructions stored thereon. The instructions are executable by the one or more processors to: receive activity data for creating an account for the transaction activity from a user, wherein the activity data include at least an identifier of the smart contract in the blockchain and an expiration time of the transaction activity, and the smart contract includes computer-readable instructions for conducting the transaction activity; send the activity data to an authentication server for requesting a digital certificate of the activity data, wherein the digital certificate stores the identifier of the smart contract, and an expiration time of the digital certificate is set to be the expiration time of the transaction activity; and cause the account for the transaction activity to be created after receiving the digital certificate from the authentication server, wherein the created account is associated with the identifier of the smart contract.

In still another aspect, a non-transitory computer-readable medium has stored therein instructions that, when executed by a processor of a device, cause the device to perform a method for protecting sensitive data of a transaction activity based on a smart contract in a blockchain. The method includes: receiving activity data for creating an account for the transaction activity from a user, wherein the activity data include at least an identifier of the smart contract in the blockchain and an expiration time of the transaction activity, and the smart contract includes computer-readable instructions for conducting the transaction activity; sending the activity data to an authentication server for requesting a digital certificate of the activity data, wherein the digital certificate stores the identifier of the smart contract, and an expiration time of the digital certificate is set to be the expiration time of the transaction activity; and causing the account for the transaction activity to be created after receiving the digital certificate from the authentication server, wherein the created account is associated with the identifier of the smart contract.

BRIEF DESCRIPTION OF THE DRAWINGS

The accompanying drawings, which are incorporated in and constitute a part of this specification, illustrate embodiments. In the following description, which refers to the drawings, the same numbers in different drawings represent the same or similar elements unless otherwise represented.

DETAILED DESCRIPTION

Figure 1:
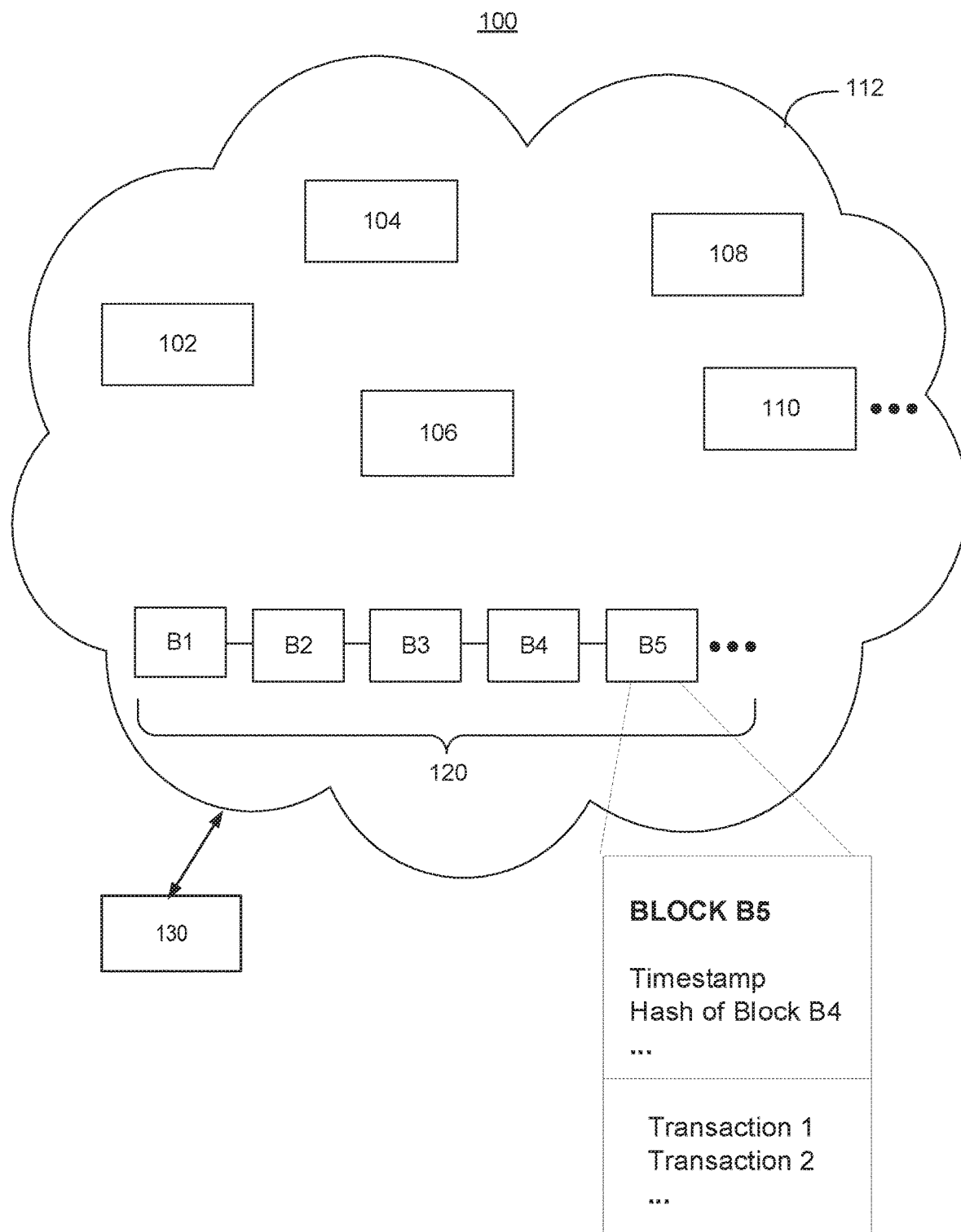
FIG. 1 is a schematic diagram of a blockchain system, according to an embodiment.

Embodiments of the specification provide methods and devices for protecting sensitive data of a transaction activity based on a smart contract in a block chain, such as a consortium blockchain. The methods and devices allow one or more processors to receive from a user a request for creating a transaction activity based on a smart contract in a blockchain system. If the one or more processors permit the request, the methods and devices then allow the one or more processors to receive, from the user, activity data associated with the transaction activity including an identifier of the smart contract and an expiration time of the transaction activity. The methods and devices then send the activity data and a request for a digital certificate of the activity data to an authentication server, where the digital certificate is also set to expire at the expiration time. After receiving the digital certificate from the authentication server, the methods and devices then request to create an account for the transaction activity in the blockchain system based on the digital certificate. The methods and devices then associate the created account with the identifier of the smart contract, which may include computer-readable instructions to enforce a rule of the transaction activity.

Embodiments disclosed in the specification have one or more technical effects. In some embodiments, the methods and devices provide a blockchain system with the ability to create accounts based on specific transaction activities rather than based on identities of users, e.g., merchants, such that the accounts are specially created and associated for transaction activities in the blockchain. This allows the users to control the transaction activities in the blockchain system without exposing their identities to other users of the blockchain system, therefore avoiding involuntary disclosure of sensitive data while keeping insensitive data open and transparent. In some embodiments, the methods and devices provide the blockchain system with the abilities to authenticate the identities of the users before creating the accounts. This allows other blockchain users, such as customers of the merchants, to trust the validity, accuracy, and security of the transaction activities and the merchants. In some embodiments, the methods and devices provide the blockchain system with the abilities to obtaining digital certificates for performing transactions of the transaction activities. This allows assurance of accuracy and validity of the account information. In some embodiments, the methods and devices provide the abilities to set expiration times of the digital certificates as the expiration times of the transaction activities. This allows assurance of validity, real time, and security of the accounts for the transaction activities because the digital certificates may not be misused or abused after the transaction activities expire. This also allows fine timing control of the transaction activity despite certain activity data are permanently stored in the blockchain. This also allows decoupling the correspondence between a user identity and an account identifier in the blockchain. Practically, allowing creating accounts in the blockchain system based on transaction activities and authenticating the accounts before creating the transaction activities enable the blockchain system to hide the identities of the users from the public, thereby protecting privacy of the users while not sacrificing the openness and transparency characteristics of smart-contract based transaction activities.

The following description provides details of embodiments. In the embodiments, a blockchain is a data structure that stores data, e.g., transactions, in a way that the transactions may be immutable and subsequently verified. A blockchain includes one or more blocks. Each block is linked to a previous block immediately before it in the blockchain by including a cryptographic hash of the previous block. Each block also may include a timestamp, its own cryptographic hash, and one or more transactions. The transactions, which generally have already been verified by the nodes of the blockchain system, may be hashed and encoded into a data structure, such as a Merkle tree. In a Merkle tree, data at leaf nodes of the tree is hashed, and all hashes in each branch of the tree may be concatenated at a root of the branch. This process continues up the tree to the root of the entire tree, which stores a hash that is representative of all data in the tree. A hash purporting to be of a transaction stored in the tree can be quickly verified by determining whether it is consistent with the structure of the tree.

A blockchain system includes a network of computing nodes that manage, update, and maintain one or more blockchains. The network may be a public blockchain network, a private blockchain network, or a consortium blockchain network. For example, numerous entities, such as hundreds, thousands, or even millions of entities, can operate in a public blockchain network, and each of the entities operates at least one node in the public blockchain network. Accordingly, the public blockchain network can be considered a public network with respect to the participating entities. Sometimes, a majority of entities (nodes) must sign every block for the block to be validated and added to the blockchain of the blockchain network. Examples of public blockchain networks include particular peer-to-peer payment networks that leverage a distributed ledger, referred to as blockchain.

In general, a public blockchain network may support public transactions. A public transaction is shared with all of the nodes in the public blockchain network, and is stored in a global blockchain. A global blockchain is a blockchain replicated across all nodes, and all nodes are in consensus with respect to the global blockchain. To achieve consensus (e.g., agreement to the addition of a block to a blockchain), a consensus protocol is implemented in the public blockchain network. Examples of consensus protocols include proof-of-work (POW) (e.g., implemented in some cryptocurrency networks), proof-of-stake (POS), and proof-of-authority (POA).

In general, a private blockchain network may be provided for a particular entity, which centrally controls read and write permissions. The entity controls which nodes are able to participate in the blockchain network. Consequently, private blockchain networks are generally referred to as permissioned networks that place restrictions on who is allowed to participate in the network, and on their level of participation (e.g., only in certain transactions). Various types of access control mechanisms can be used (e.g., existing participants vote on adding new entities, a regulatory authority can control admission).

In general, a consortium blockchain network may be private among the participating entities. In a consortium blockchain network, the consensus process is controlled by an authorized set of nodes, one or more nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network. Accordingly, the consortium blockchain network can be considered a private network with respect to the participating entities. In some examples, each entity (node) must sign every block in order for the block to be validated and added to the blockchain. In some examples, at least a subset of entities (nodes) (e.g., at least 7 entities) must sign every block in order for the block to be validated and added to the blockchain, FIG. 1 illustrates a schematic diagram of a blockchain system 100, according to an embodiment. Referring to FIG. 1, the blockchain system 100 may include a plurality of nodes, e.g., nodes 102-110, configured to operate on a blockchain 120. The nodes 102-110 may form a network 112, such as a peer-to-peer (P2P) network. Each of the nodes 102-110 may be a computing device, such as a computer or a computer system, configured to store a copy of the blockchain 120, or may be software running on the computing device, such as a process or an application. Each of the nodes 102-110 may have a unique identifier.

The blockchain 120 may include a growing list of records in the form of data blocks, such as blocks B1-B5 in FIG. 1. Each of the blocks B1-B5 may include a timestamp, a cryptographic hash of a previous block, and data of the present block, which may be transactions such as monetary transactions. For example, as illustrated in FIG. 1, block B5 may include a timestamp, a cryptographic hash of block B4, and transaction data of block B5. Also, for example, a hashing operation may be performed on the previous block to generate the cryptographic hash of the previous block. The hashing operation may convert inputs of various lengths into cryptographic outputs of a fixed length through a hash algorithm, such as SHA-256.

The nodes 102-110 may be configured to perform an operation on the blockchain 120. For example, when a node, e.g., the node 102, wants to store new data onto the blockchain 120, that node may generate a new block to be added to the blockchain 120 and broadcast the new block to other nodes, e.g., the nodes 104-110, in the network 112. Based on legitimacy of the new block, e.g., validity of its signature and transactions, the other nodes may determine to accept the new block, such that the node 102 and the other nodes may add the new block to their respective copies of the blockchain 120. As this process repeats, more and more blocks of data may be added to the blockchain 120.

In some embodiments, the blockchain system 100 may operate according to one or more smart contracts. Each smart contract may be a computer protocol in the form of computer code that is incorporated into the blockchain 120, to facilitate, verify, or enforce the negotiation or performance of a contract. For example, a user of the blockchain system 100 may program agreed terms into a smart contract using a programming language, such as C++, Java, Solidity, Python, etc., and when the terms are met, the smart contract may be automatically executed by the blockchain system 100, e.g., to perform a transaction. Also for example, the smart cant act may include a plurality of subroutines or functions, each of which may be a sequence of program instructions that perform a specific task. The smart contract may be operational codes that are fully or partially executed without human interaction.

As each of the nodes 102-110 may store a copy of the blockchain 120, each of the nodes 102-110 may also have access to a copy of the smart contract included in the blockchain 120. In some embodiments, the smart contract may be assigned with an address on the blockchain 120, e.g., after the smart contract is compiled into operational code. The address of the smart contract is configured to locate the smart contract on the blockchain 120.

In some embodiments, a node (e.g., the node 102) in the blockchain system 100 may perform a transaction based on a copy of the smart contract. After a new block including the transaction is broadcasted to the blockchain system 100, other nodes in the blockchain system 100 may verify the new block. After the new block is verified by a majority or all of the nodes in the blockchain system 100, the new block may be added to the respective copies of the blockchain 120 on those nodes, and the transaction is complete.

Figure 2:
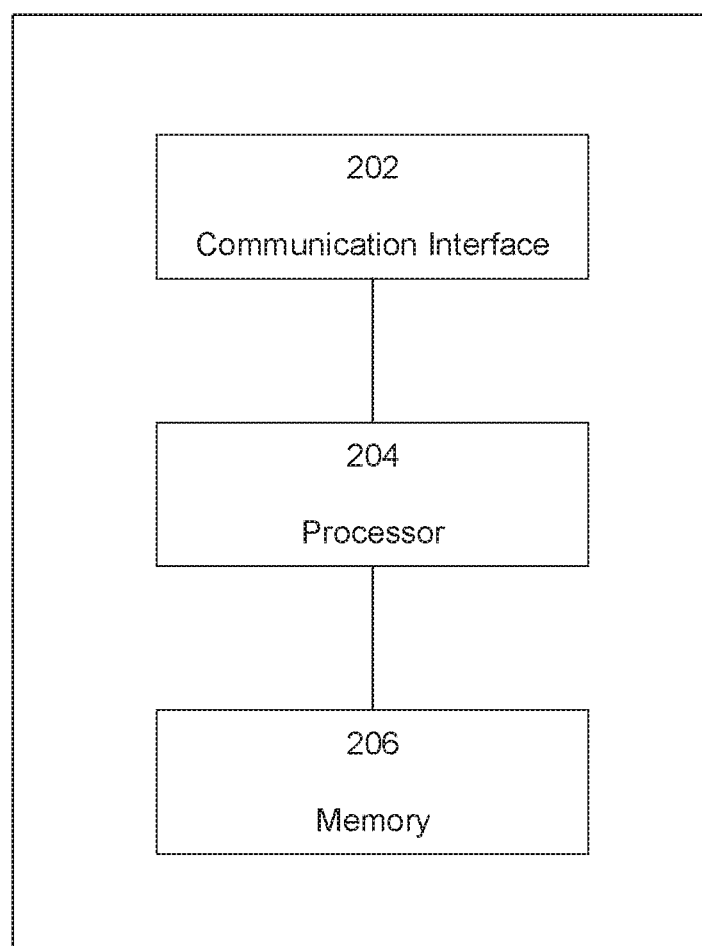
FIG. 2 is a schematic diagram of a computing device for implementing a node in a blockchain system, according to an embodiment.

FIG. 2 illustrates a schematic diagram of a computing device 200 for implementing a node, e.g., the node 102 (FIG. 1), in a blockchain system, according to an embodiment. Referring to FIG. 2, the computing device 200 may include a communication interface 202, a processor 204, and a memory 206.

The communication interface 202 may facilitate communications between the computing device 200 and devices implementing other nodes, e.g., nodes 104-110 (FIG. 1), in the network. In some embodiments, the communication interface 202 is configured to support one or more communication standards, such as an Internet standard or protocol, an Integrated Services Digital Network (ISDN) standard, etc. In some embodiments, the communication interface 202 may include one or more of a Local Area Network (LAN) card, a cable modem, a satellite modem, a data bus, a cable, a wireless communication channel, a radio-based communication channel, a cellular communication channel, an Internet Protocol (IP) based communication device, or other communication devices for wired and/or wireless communications. In some embodiments, the communication interface 202 may be based on public cloud infrastructure, private cloud infrastructure, hybrid public/private cloud infrastructure.

The processor 204 may include a central processing unit (CPU) or a graphics processing unit (GPU). In some embodiments, the processor 204 may include one or more dedicated processing units, application-specific integrated circuits (ASICs), field-programmable gate arrays (FPGAs), or various other types of processors or processing units. The processor 204 is coupled with the memory 206 and is configured to execute instructions stored in the memory 206.

The memory 206 may store processor-executable instructions and data, such as a copy of the blockchain 120 (FIG. 1). The memory 206 may include any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk. When the instructions in the memory 206 are executed by the processor 204, the computing device 200 may perform an operation on the blockchain 120.

Referring back to FIG. 1, the blockchain system 100 may be used in transaction activities that involve open data and transparent terms, such as a sales promotion activity, a marketing activity, etc. For example, a merchant selling traceable organic food may want to promote sales by issuing coupons to customers who never purchased such products. By using the blockchain system 100, tracing data of the products may be stored in blocks of a blockchain, such as the blockchain 120, and issuance of the coupons may be enforced using smart contracts. For example, if a customer meets a term specified in a smart contract (e.g., "consumer never purchased this product"), a corresponding event may be enforced to occur (e.g., "issue a coupon to that consumer"). Using smart contracts may make the contract terms and conditions transparent because smart contracts are stored in a blockchain and open to inspection. Activity related data (or "activity data" for simplicity) may be stored in the blockchain as well, such as a total value of the coupons to be issued, a total number of the coupons to be issued, an expiration time (e.g., date) of the sales promotion, etc. By storing the smart contracts and activity data in the blockchain, such as the blockchain 120, the customers may be assured that the above information is true, accurate, and unable to be falsified or tempered by malicious parties.

In an embodiment, an account based on a transaction activity, rather than a user's identity, may be created and used for the blockchain system 100. In this way, sensitive data of the user, e.g., the user's identity, may be concealed and prevented from involuntary disclosure, while insensitive data of the user may be kept open and transparent, thus promoting utilization of blockchain systems and smart contracts for transaction activities.

For example, a device 130 in FIG. 1 may be used by a user to interact with the blockchain system 100. The device 130 may be a computing device similar to the computing device 200 (FIG. 2), which may include a communication interface, a processor, and a memory. In some embodiments, the device 130 operates as a node of the blockchain system 100. In other embodiments, the device 130 does not operate as a node and may interact with the blockchain system 100 through connections established with one or more nodes, e.g., the nodes 102-110, of the blockchain system 100. The connections may be established through one or more application programming interfaces (APIs). Software development kits (SDKs) may also be provided to facilitate the establishment of such connections.

Figure 3:
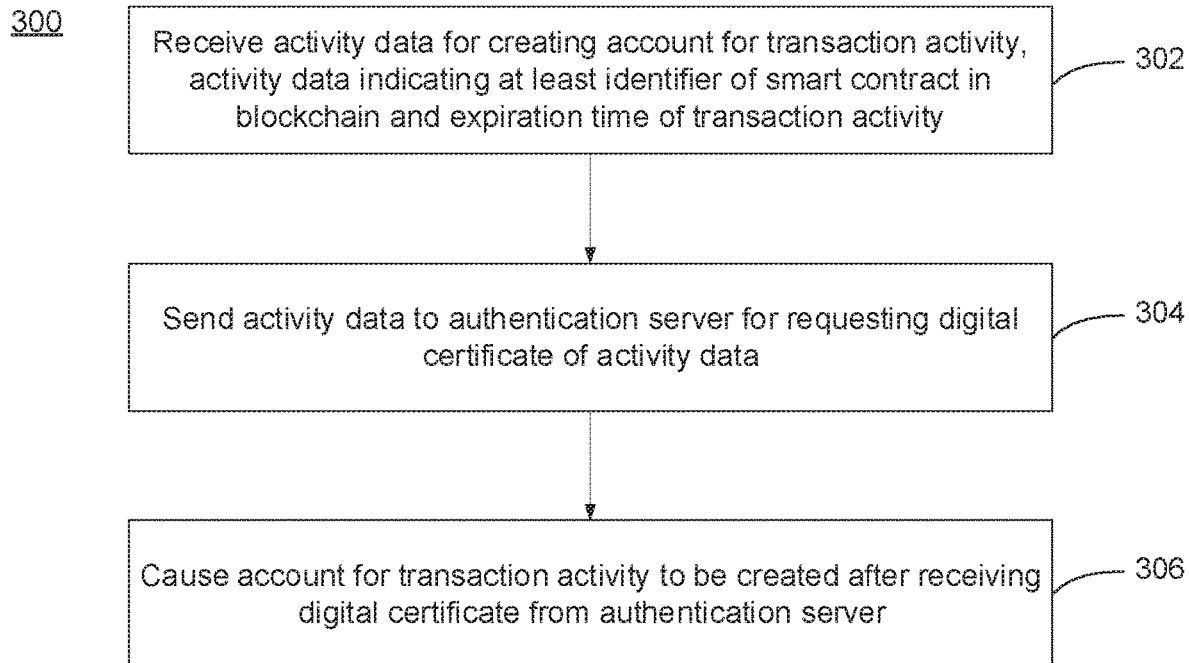
FIG. 3 is a flow chart of a method for protecting sensitive data of a transaction activity based on a smart contract in a blockchain, according to an embodiment.

FIG. 3 illustrates a flow chart of a method 300 for protecting sensitive data of a transaction activity, according to an embodiment. For example, the method 300 creates an account for the transaction activity based on a smart contract in a blockchain, such as the blockchain system 120 (FIG. 1). Also, for example, the method 300 may be performed by the device 130 (FIG. 1). In some embodiments, the blockchain may be a consortium blockchain.

Referring to FIG. 3, at step 302, one or more processors, e.g., of the device 130 (FIG. 1) receive, from a user, activity data for creating an account for a transaction activity based on a smart contract in a blockchain. The activity data may include an identifier of the smart contract and an expiration time of the transaction activity. In some embodiments, the identifier of the smart contract may include an address on the blockchain that corresponds to one or more blocks storing computer-executable instructions of the smart contract, By having access to the address, a user of the blockchain may access content and codes of the smart contract. In some embodiments, the transaction activity may be a marketing activity, a sales promotion activity, etc. For example, the sales promotion activity may be issuing coupons to consumers based on specific rules.

In some embodiments, the activity data may further include information related to the transaction activity, such as a budget of the transaction activity, a name of the activity, an identifier of the user, a remaining balance of the budget, etc. The budget of the transaction activity may be the money or fund provided by the user (e.g., a merchant) for allocating into the coupons to be issued to the user's customers. In some embodiments, the budget may further include fees for services of a blockchain service provider. The user may designate some of the activity data as sensitive, such as the identifier of the user. The user may also designate some of the activity data as insensitive, such as content of the smart contract, and the expiration time, the budget, or a remaining balance of the transaction activity.

In some embodiments, the smart contract may be provided by the user (e.g., by submitting user-generated program codes to the blockchain), or selected and configured by the user from template smart contracts provided by the blockchain service provider. For example, the user may select a smart contract from a menu and provide customized parameters. The smart contract may represent a strategy and rules of the transaction activity set by the user. For example, in a coupon-based sales promotion activity, the rules may include limitations on a permitted total value of coupons received per customer, a permitted total number of coupons received per customer, denominations of the coupons, types of the coupons, a percentage of targeted customers in a designated geographic region, methods for customers to receive the coupons, conditions and limitations for customers to use the coupons, etc. The smart contract may be associated with an identifier, and different smart contracts may be assigned by the one or more processors with different identifiers.

In some embodiments, the one or more processors may receive the activity data based on permission. For example, after receiving a request for creating the account from the user, the one or more processors may receive data indicative of a payment amount for the transaction activity from the user. The payment amount may be set by the blockchain service provider and will be used for the transaction activity. For example, the payment amount may be used as earnest money, a deposit, a retainer, a guarantee, or part or all of the budget of the transaction activity. For example, if the transaction activity is a coupon-based sales promotion, the payment amount may be part of all of the money equal to a total amount of values of the coupons. In some embodiments, the user may pay the blockchain service provider using a separate system, such as using a third-party payment service or a bank.

In some embodiments, the payment may be processed by the one or more processors. In other embodiments, the payment may be initiated by a user interface system and processed by an activity management system, both implemented by the one or more processors. Details of the user interface system and the activity management system will be set forth in descriptions in connection with FIGS. 5-6.

When the payment amount exceeds a predetermined amount, the one or more processors may permit the request for creating the account. For example, the predetermined amount may be a fixed amount or a percentage of the budget of the transaction activity. When the request is permitted, the one or more processors may then receive the activity data from the user. When the request is not permitted, the one or more processors may reject receiving the activity data.

Still referring to FIG. 3, at step 304, the one or more processors send the activity data to an authentication server for requesting a digital certificate of the activity data. In some embodiments, the authentication server may be a certificate authority (CA) server. In some embodiments, the digital certificate may store data indicative of the identifier of the smart contract. In some embodiments, an expiration time of the digital certificate may be set as the expiration time of the transaction activity. By doing so, the digital certificate may not be misused or abused by malicious parties after the transaction activity expires. When the digital certificate expires, the user may no longer be able to use the blockchain for the transaction activity. In some embodiments, when the activity data includes the budget of the transaction activity, the digital certificate may also store data indicative of the budget.

In some embodiments, the one or more processors may further send a public key associated with the user to the authentication server. The public key may be generated with a private key associated with the user, and form a pair with the private key. For example, when receiving the activity data from the user, the one or more processors may generate the public key and the private key, which may be used for secure communication and digital signature. The public and private keys may be generated using an asymmetric cryptography algorithm, such as the RSA algorithm, ElGamal algorithm, or elliptic curve cryptography (ECC) algorithm. In some embodiments, the digital certificate may store data indicative of the public key associated with the user.

In some embodiments, the digital certificate may store data indicative of an association between an identifier of the transaction activity and an identifier of the user (e.g., merchant). For example, the identifier of the transaction activity may be a randomly generated number. The identifier of the user may be a string of alphanumeric characters. The identifier of the transaction activity and the identifier of the user may be concatenated and hashed to generate a hash code. The hash code may be stored in the digital certificate. By doing so, digital certificates may be categorized by using hash codes as labels.

In some embodiments, the authentication server may generate and sign the digital certificate. The authentication server may be an authentication system 508 in FIGS. 5-6. Details of the authentication server and generation of the digital certificate will be described in the description in connection with FIGS. 5-6.

At step 306, the one or more processors cause the account associated with the identifier of the smart contract in the blockchain to be created after receiving the digital certificate from the authentication server. For example, the association between the account and the identifier of the smart contract may be implemented as a data record stored in the blockchain. In some embodiments, the identifier of the smart contract may be sent to the authentication server for generation of the digital certificate. In those embodiments, the digital certificate may further store data indicative of the identifier of the smart contract. In some embodiments, the smart contract may include computer-readable instructions for enforcing a rule of the transaction activity.

In some embodiments, the one or more processors may determine whether the digital certificate is valid using a public key of the authentication server. The public key of the authentication server may be generated together with a private key of the authentication server. The private key of the authentication server may be used to encrypt the generated digital certificate. The public key of the authentication server may be used by receivers of the digital certificate for validation. For example, the one or more processors may previously receive the public key from the authentication server, or may retrieve it from the authentication server on demand. If the digital certificate is valid, the one or more processors may create the account in the blockchain. In some embodiments, the one or more processors may further set a balance amount of the account as the budget.

In some embodiments, after the account is created, the one or more processors may inform the user of such information. For example, to confirm the account has been created, the one or more processors may receive an identifier of the account generated by the blockchain system. The identifier of the account may be generated as a hash code. The one or more processors may then send data to the user, which may indicate that the account having been created to the user. For example, the data may include the identifier of the account.

After creating the account for the transaction activity, the user (e.g., the merchant) may publish entry data for the transaction activity to its customers. The entry data of the transaction activity may provide entry for customers to access information of the transaction activity. The entry data may be implemented in various forms, such as a hyperlink, a quick response (QR) code, an advertisement in a mobile app, or the like. When customers access the entry data (e.g., by clicking a link), they may access designated insensitive data of the transaction activity, such as the name, the rules, the budget, the remaining balance, or the expiration time of the activity. The customers and other merchants that access the blockchain may be unable to access sensitive data of the transaction activity, such as the identity of the merchant that launches the transaction activity.

Figure 4:
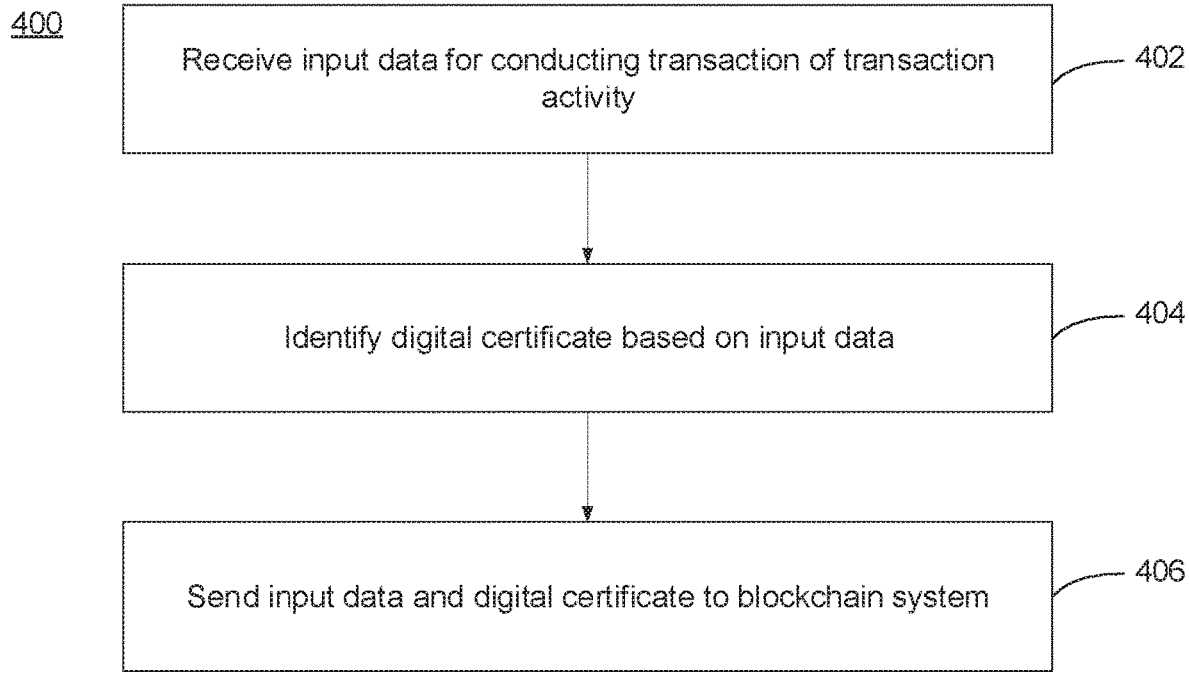
FIG. 4 is a flow chart of a method for protecting sensitive data of a transaction activity based on a smart contract in a blockchain, according to an embodiment.

FIG. 4 is a flow chart of a method 400 for protecting sensitive data of a transaction activity, according to an embodiment. For example, the method 400 performs a transaction of the transaction activity based on a smart contract in a blockchain. Also, for example, the method 400 may be performed by the device 130, and the blockchain may be the blockchain 120 (FIG. 1). In some embodiments, the blockchain may be a consortium blockchain. In some embodiments, the method 400 may be implemented as a following process of the method 300 after step 306 (FIG. 3), or as an independent process after the account for the transaction activity is created.

Referring to FIG. 4, at step 402, one or more processors, e.g., of the device 130 (FIG. 1), receive input data for conducting a transaction of the transaction activity. The input data may include the identifier of the account.

In some embodiments, a customer of the user may access the entry data published by the user and submits the input data to the one or more processors. The input data may include, for example, an identifier of the customer, the name of the transaction activity, the identifier of the account associated with the transaction activity, types, number, and value of coupons requested by the customer, purchase history of the customer, review data of purchased products provided by the customer, a total value of coupons having been received by the customer, a total number of coupons having been received by the customer, denominations and types of the coupons having been received by the customer, a geographic region where the customer locates, consumed coupons by the customer, etc.

At step 404, the one or more processors identify the digital certificate based on the input data. In some embodiments, the one or more processors may identify the digital certificate using the identifier of the account. For example, the one or more processors may search the device 130 (FIG. 1) using the identifier of the account, to locate the digital certificate. In some embodiments, the one or more processors may further obtain the identifier of the smart contract using the identified digital certificate.

At step 406, the one or more processors send the input data and the digital certificate to the blockchain system. In some embodiments, the one or more processors also send the identifier of the smart contract to the blockchain system. The blockchain system may conduct the transaction after the digital certificate and the smart contract are validated.

In some embodiments, the one or more processors may encrypt the input data, the digital certificate, and the identifier of the smart contract using the private key associated with the user (e.g., the merchant). The one or more processors may send encrypted data to the blockchain system. The blockchain system may then obtain the input data, the digital certificate, and the identifier of the smart contract by decrypting the encrypted data using the public key of the user. The expiration time of the digital certificate may further be checked against the current time to ensure that the digital certificate does not expire. In some embodiments, the blockchain system may determine whether the smart contract is valid by checking whether an association between the identifier of the smart contract and the account of the transaction activity exists.

In some embodiments, after determining that the digital certificate and the identifier of the smart contract are valid, the blockchain system may conduct the transaction by executing the computer-readable instructions of the smart contract based on the input data.

Figure 5:
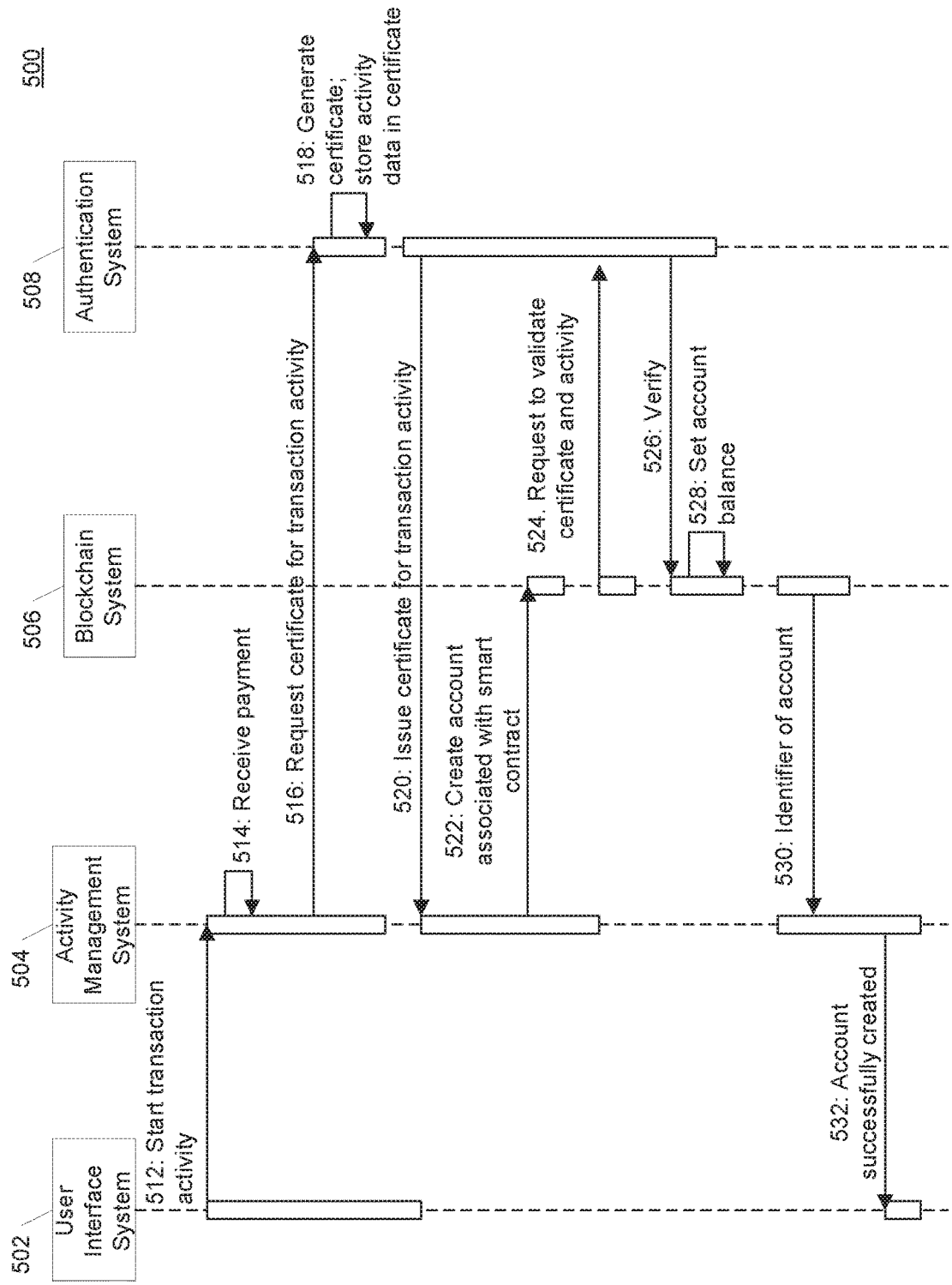
FIG. 5 is a flow chart of a method for protecting sensitive data of a transaction activity based on a smart contract in a blockchain, according to an embodiment.

FIG. 5 is a flow chart of a method 500 for protecting sensitive data of a transaction activity, according to an embodiment. For example, the method 500 creates an account for a transaction activity based on a smart contract in a blockchain. Also, for example, the method 500 may be performed by a user interface system 502 for interacting with users to input and output data, an activity management system 504 for managing transactions of a transaction activity, a blockchain system 506 such as the blockchain system 100 (FIG. 1), and an authentication system 508.

In some embodiments, the user interface system 502 and the activity management system 504 may be implemented with one or more processors, e.g., the one or more processors of the device 130 (FIG. 1). In some embodiments, the user interface system 502 and the activity management system 504 may be implemented on the same node in the blockchain system 100 (FIG. 1). In that case, the user interface system 502 and the activity management system 504 may be implemented as different virtual machines or program modules. In some embodiments, the user interface system 502 and the activity management system 504 may be implemented on different nodes in the blockchain system 100 (FIG. 1).

In some embodiments, the user interface system 502 may be implemented as a server for interactions with users of a blockchain. For example, the user interface system 502 may be implemented as a website or a back-end server of a mobile application. The user interface system 502 may manage the users of the blockchain using accounts and passwords.

The authentication system 508 may be a separate system, such as an authentication server. For example, the authentication system 508 may be implemented as a certificate authority (CA) server. The authentication system 508 may issue and authenticate digital certificates for transaction activities conducted in the blockchain system 506. In some embodiments, the authentication system 508 may be entrusted by users of a consortium blockchain. In some embodiments, the authentication system 508 may be provided by a blockchain service provider, or by a third-party service provider. The authentication system 508 may generate a pair of public key and private key for encryption and authentication. The private key may be exclusively stored in and used by the authentication system 508 for encryption or decryption. The public key may be sent to users of the authentication system 508 for encryption or decryption. Such encryption and decryption may conform to a cryptography standard, such as X.509 protocol.

For example, when generating a digital certificate requested by the activity management system 504, the authentication system 508 may encrypt a hashed portion (referred to as "digest") of data of the generated digital certificate using its private key and store the encrypted digest as part of the digital certificate, the process of which may be referred to as "signing." When a user system receives the signed digital certificate, the user system may decrypt the encrypted digest in the signed digital certificate using the public key of the authentication system 508, and compare the decrypted digest with a re-generated digest of the data (e.g., by re-hashing the data). If the decrypted digest and the re-generated digest are the same, the digital certificate may be deemed as valid. The public key of the authentication system 508 may be stored in the user system, or may be retrieved from the authentication system 508 on demand.

Referring to FIG. 5, at step 512, the user interface system 502 may receive a request for starting a transaction activity, such as a coupon-based sales promotion. For example, a merchant, as a user, may log in the user interface system 502 and provide activity data (e.g., by filling out a form) of the transaction activity. The activity data may be similar to the activity data as described above in connection with step 302 (FIG. 3).

At step 514, the activity management system 504 may receive a payment from the merchant. The payment may be similar to the payment amount as described above in connection with step 302 (FIG. 3). When the payment is received, the activity management system 504 may receive the activity data from the user interface system 502 for application of a digital certificate for the transaction activity.

At step 516, the activity management system 504 may send the activity data to the authentication system 508 for requesting a digital certificate for the transaction activity, similar to step 304 (FIG. 3). At step 518, the authentication system 508 may generate the digital certificate. In some embodiments, the authentication system 508 may store some activity data into the digital certificate, such as at least one of the identifier of a smart contract designated by the user, a budget of the transaction activity, or an expiration time of the transaction activity. The authentication system 508 may also sign the digital certificate.

At step 520, the activity management system 504 receives the signed digital certificate from the authentication system 508. At step 522, the activity management system 504 creates an account for the transaction activity and associate the account with the smart contract designated by the user in the blockchain system 506. Step 522 may be implemented similar to step 306 (FIG. 3).

At step 524, the blockchain system 506 may request the authentication system 508 to determine whether the digital certificate and the transaction activity are valid. At step 526, the authentication system 508 verifies the digital certificate and the transaction activity and sends a verification result to the blockchain system 506. At step 528, the blockchain system 506 sets a balance amount (e.g., equal to the budget) for the created account. In some embodiments, the blockchain system 506 may generate an identifier (e.g., a hash code) for the account.

At step 530, the blockchain system 506 may send the identifier of the account to the activity management system 504. At step 532, the activity management system 504 may indicate to the user interface system 502 that the account for the transaction activity is successfully created.

Figure 6:
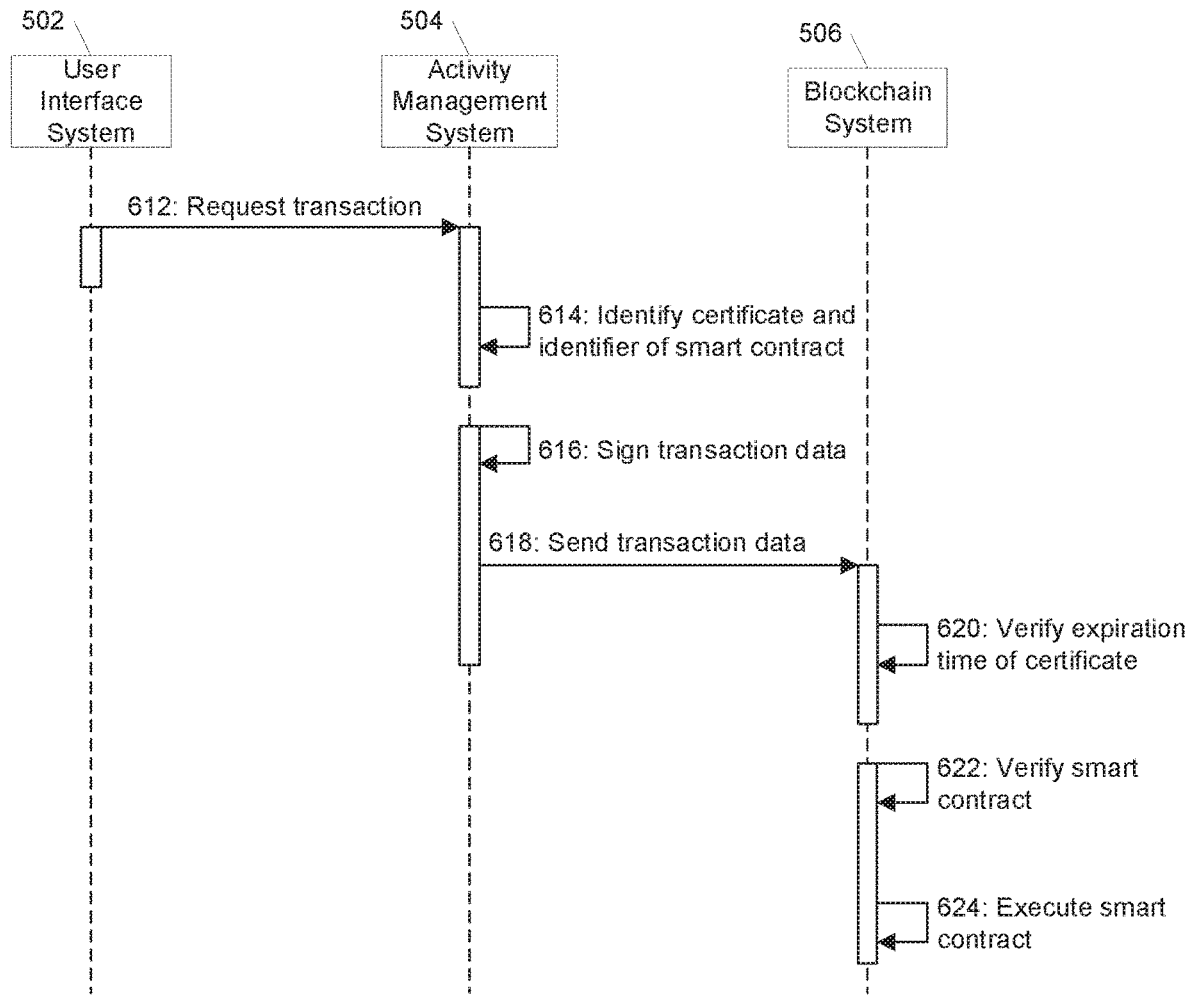
FIG. 6 is a flow chart of a method for protecting sensitive data of a transaction activity based on a smart contract in a blockchain, according to an embodiment.

FIG. 6 is a flow chart of a method 600 for performing a transaction of a transaction activity based on a smart contract in a blockchain, according to an embodiment. For example, the method 600 may be performed by the user interface system 502, the activity management system 504, and the blockchain system 506 described above in connection with FIG. 5.

At step 612, the user interface system 502 may receive input data from a user for conducting a transaction of the transaction activity. In some embodiments, a customer of the user may access the entry data published by the user and submits the input data to the user interface system 502. The input data may be similar to the input data as described above in connection with step 402 (FIG. 4). At step 614, the activity management system 504 may identify the digital certificate and the identifier of the smart contract based on the input data. In some embodiments, the management system 504 may also identify a private key associated with the user, which may be used for encrypting data sent by the management system 504 for security reasons.

At step 616, the activity management system 504 may sign transaction data including, e.g., the input data received from the user interface system 502, the digital certificate, and the identifier of the smart contract. For example, the signing process may be using the private key associated with the user to encrypt the input data and the identifier of the smart contract. At step 618, the activity management system 504 may send the signed transaction data to the blockchain system 506.

At step 620, the blockchain system 506 may verify the validity of the digital certificate, such as by comparing the expiration time of the digital certificate with the current time. At step 622, the blockchain system 506 may verify the smart contract, such as by checking the association of the identifier of the smart contract and the identifier of the account. The identifier of the smart contract may be decrypted using the public key associated with the user. The public key associated with the user may be decrypted from the digital certificate using the public key of the authentication system 508. At step 624, if both the digital certificate and the smart contract are verified, the smart contract may be executed. The input data may be decrypted using the public key associated with the user, and used as the input to the smart contract.

Figure 7:
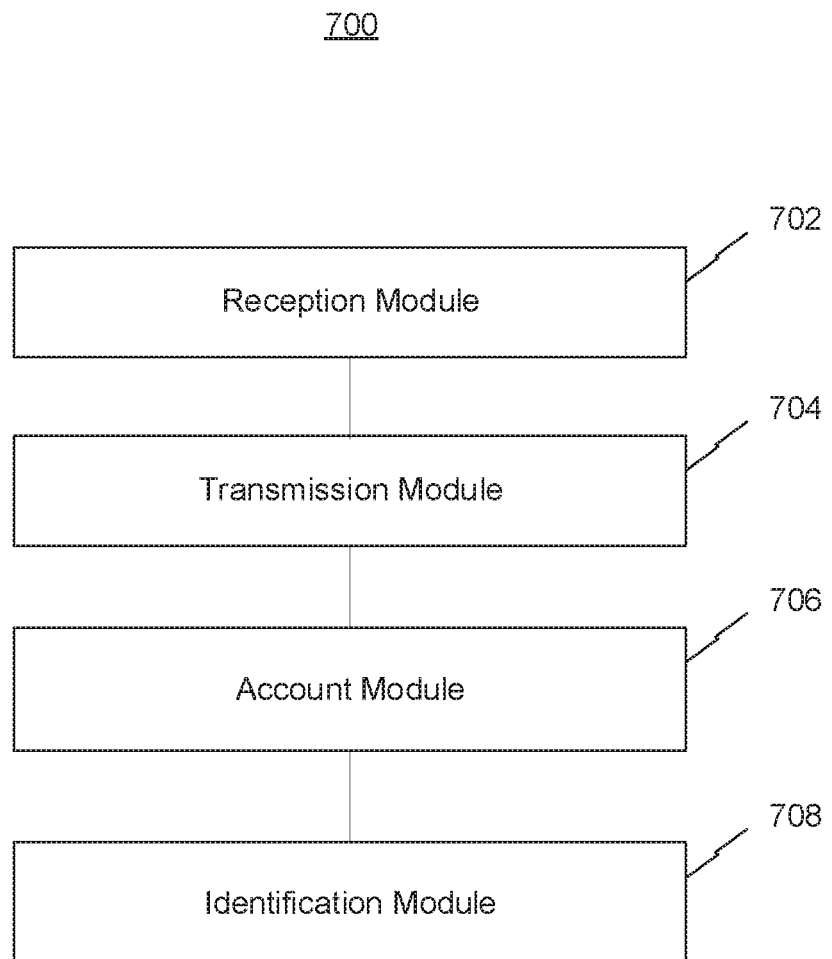
FIG. 7 is a block diagram of an apparatus for protecting sensitive data of a transaction activity based on a smart contract in a blockchain, according to an embodiment.

FIG. 7 is a block diagram of an apparatus 700 for protecting sensitive data in a transaction activity based on a smart contract in a blockchain, according to an embodiment. For example, the apparatus 700 may implement the device 130 (FIG. 1). Also for example, the apparatus 700 may perform the method 300 (FIG. 3) and the method 400 (FIG. 4). Referring to FIG. 7, the apparatus 700 includes a reception module 702, a transmission module 704, and an account module 706.

The reception module 702 may receive, from a user, activity data for creating an account for a transaction activity based on a smart contract in a blockchain. The activity data may include an identifier of the smart contract and an expiration time of the transaction activity. The transmission module 704 may send the activity data to an authentication server for requesting a digital certificate of the activity data. The digital certificate may store the identifier of the smart contract, and an expiration time of the digital certificate may be set to be the expiration time of the transaction activity. The account module 706 may cause the account for the transaction activity to be created after receiving the digital certificate from the authentication server, the created account for the transaction activity being associated with the identifier of the smart contract in the blockchain.

The apparatus 700 may also include an identification module 708. The identification module 708 may identify the digital certificate and the identifier of the smart contract using the identifier of the account, after the reception module 702 receives input data for conducting a transaction of the transaction activity. The input data may include the identifier of the account.

Each of the above described modules may be implemented as software, or hardware, or a combination of software and hardware. For example, each of the above described modules may be implemented using a processor executing instructions stored in a memory. Also, for example, each the above described modules may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the described methods. Further for example, each of the above described modules may be implemented by using a computer chip or an entity, or implemented by using a product having a certain function. In one embodiment, the apparatus 700 may be a computer, and the computer may be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an implementation process of functions and roles of each module in the apparatus 700, references can be made to corresponding steps in the above-described methods. Details are omitted here for simplicity.

In some embodiments, a computer program product may include a non-transitory computer-readable storage medium having computer-readable program instructions thereon for causing a processor to carry out the above-described methods.

The computer-readable storage medium may be a tangible device that can store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The computer-readable program instructions for carrying out the above-described methods may be assembler instructions, instruction-set-architecture (ISA) instructions, machine instructions, machine dependent instructions, microcode, firmware instructions, state-setting data, or source code or object code written in any combination of one or more programming languages, including an object oriented programming language, and conventional procedural programming languages. The computer-readable program instructions may execute entirely on a computing device as a stand-alone software package, or partly on a first computing device and partly on a second computing device remote from the first computing device. In the latter scenario, the second, remote computing device may be connected to the first computing device through any type of network, including a local area network (LAN) or a wide area network (WAN).

The computer-readable program instructions may be provided to a processor of a general-purpose or special-purpose computer, or other programmable data processing apparatus to produce a machine, such that the instructions, which execute via the processor of the computer or other programmable data processing apparatus, create means for implementing the above-described methods.

The flow charts and diagrams in the figures illustrate the architecture, functionality, and operation of possible embodiments of devices, methods, and computer program products according to various embodiments of the specification. In this regard, a block in the flow charts or diagrams may represent a software program, segment, or portion of code, which comprises one or more executable instructions for implementing specific functions. It should also be noted that, in some alternative embodiments, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the diagrams and/or flow charts, and combinations of blocks in the diagrams and flow charts, may be implemented by special purpose hardware-based systems that perform the specified functions or acts, or combinations of special purpose hardware and computer instructions.

It is appreciated that certain features of the specification, which are, for clarity, described in the context of separate embodiments, may also be provided in combination in a single embodiment. Conversely, various features of the specification, which are, for brevity, described in the context of a single embodiment, may also be provided separately or in any suitable subcombination or as suitable in any other described embodiment of the specification. Certain features described in the context of various embodiments are not essential features of those embodiments, unless noted as such.

Although the specification has been described in conjunction with specific embodiments, many alternatives, modifications and variations will be apparent to those skilled in the art. Accordingly, the following claims embrace all such alternatives, modifications and variations that fall within the terms of the claims.

What is claimed is:

1. A computer-implemented method for creating an account for a transaction activity in a blockchain system, the method comprising:
sending activity data of the transaction activity to an authentication server for requesting a digital certificate of the activity data, the activity data including at least an identifier of a smart contract in a blockchain;
receiving the digital certificate from the authentication server, wherein the digital certificate stores the identifier of the smart contract;
causing the blockchain system to perform:
determining whether the digital certificate is valid using a public key associated with the authentication server; and
creating the account for the transaction activity based on a determination that the digital certificate is valid, wherein the created account is associated with the identifier of the smart contract; and
receiving, from the blockchain system, an identifier of the account for the transaction activity.

2. The method of claim 1, wherein the account is created to protect sensitive data including at least data indicative of an identity of a user.

3. The method of claim 1, wherein the activity data further include a budget of the transaction activity, and the digital certificate includes data indicative of the budget.

4. The method of claim 1, wherein the blockchain is a consortium blockchain.

5. The method of claim 1, further comprising:
causing the blockchain system to set a balance amount of the account to be the budget.

6. The method of claim 1, further comprising:
receiving, from a user, the activity data for creating the account for the transaction activity, the activity data further including an expiration time of the transaction activity,
wherein an expiration time of the digital certificate is set to be the expiration time of the transaction activity.

7. The method of claim 6, wherein the receiving, from the user, the activity data comprises:
in response to receiving a request for creating the account for the transaction activity from the user, receiving data indicative of a payment amount for the transaction activity;
permitting the request based on a determination that the payment amount exceeds a predetermined amount; and
in response to permitting the request, receiving the activity data for the transaction activity from the user.

8. The method of claim 7, further comprising:
sending an indication that the account has been created to the user.

9. The method of claim 1, wherein the smart contract comprises computer-readable instructions for enforcing a rule of the transaction activity.

10. The method of claim 1, further comprising:
receiving input data for conducting a transaction of the transaction activity, the input data including the identifier of the account for the transaction activity;
identifying the digital certificate based on the identifier of the account for the transaction activity; and
sending the input data and the digital certificate to the blockchain system, wherein the transaction is conducted based on a determination that the digital certificate and the smart contract are valid.

11. A device for creating an account for a transaction activity in a blockchain system, the device comprising:
one or more processors; and
one or more computer-readable memories coupled to the one or more processors and having instructions stored thereon that are executable by the one or more processors, wherein the one or more processors are configured to:
send activity data of the transaction activity to an authentication server for requesting a digital certificate of the activity data, the activity data including at least an identifier of a smart contract in a blockchain;

receive the digital certificate from the authentication server, wherein the digital certificate stores the identifier of the smart contract;

cause the blockchain system to perform:
  determining whether the digital certificate is valid using a public key associated with the authentication server; and
  creating the account for the transaction activity based on a determination that the digital certificate is valid, wherein the created account is associated with the identifier of the smart contract; and receive, from the blockchain system, an identifier of the account for the transaction activity.

12. The device of claim 11, wherein the account is created to protect sensitive data including at least data indicative of an identity of a user.

13. The device of claim 11, wherein the activity data further include a budget of the transaction activity, and the digital certificate includes data indicative of the budget.

14. The device of claim 11, wherein the one or more processors are further configured to:
  cause the blockchain system to set a balance amount of the account to be the budget.

15. The device of claim 11, wherein the one or more processors are further configured to:
  receive, from a user, the activity data for creating the account for the transaction activity, the activity data further including an expiration time of the transaction activity,
  wherein an expiration time of the digital certificate is set to be the expiration time of the transaction activity.

16. The device of claim 15, wherein in receiving, from the user, the activity data, the one or more processors are further configured to:
  in response to receiving a request for creating the account for the transaction activity from the user, receive data indicative of a payment amount for the transaction activity;
  permit the request based on a determination that the payment amount exceeds a predetermined amount; and
  in response to permitting the request, receive the activity data for the transaction activity from the user.

17. The device of claim 16, wherein the one or more processors are further configured to:
  send an indication that the account has been created to the user.

18. The device of claim 11, wherein the smart contract comprises computer-readable instructions for enforcing a rule of the transaction activity.

19. The device of claim 11, wherein the one or more processors are further configured to:
  receive input data for conducting a transaction of the transaction activity, the input data including the identifier of the account for the transaction activity;
  identify the digital certificate based on the identifier of the account for the transaction activity; and
  send the input data and the digital certificate to the blockchain system, wherein the transaction is conducted based on a determination that the digital certificate and the smart contract are valid.

20. A non-transitory computer-readable medium having stored therein instructions that, when executed by a processor of a device, cause the device to perform a method for creating an account for a transaction activity in a blockchain system, the method comprising:
  sending activity data of the transaction activity to an authentication server for requesting a digital certificate of the activity data, the activity data including at least an identifier of a smart contract in a blockchain;
  receiving the digital certificate from the authentication server, wherein the digital certificate stores the identifier of the smart contract;
  causing the blockchain system to perform:
    determining whether the digital certificate is valid using a public key associated with the authentication server; and
    creating the account for the transaction activity based on a determination that the digital certificate is valid, wherein the created account is associated with the identifier of the smart contract; and
  receiving, from the blockchain system, an identifier of the account for the transaction activity.

* * * * *